United States Patent
Okutani et al.

(10) Patent No.: US 11,881,550 B2
(45) Date of Patent: Jan. 23, 2024

(54) BATTERY

(71) Applicants: SANYO ELECTRIC CO., LTD., Osaka (JP); PANASONIC CORPORATION, Osaka (JP)

(72) Inventors: Oose Okutani, Osaka (JP); Shinya Geshi, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 376 days.

(21) Appl. No.: 17/043,015

(22) PCT Filed: Apr. 3, 2019

(86) PCT No.: PCT/JP2019/014854
§ 371 (c)(1),
(2) Date: Sep. 29, 2020

(87) PCT Pub. No.: WO2019/194238
PCT Pub. Date: Oct. 10, 2019

(65) Prior Publication Data
US 2021/0020977 A1 Jan. 21, 2021

(30) Foreign Application Priority Data
Apr. 6, 2018 (JP) .................................. 2018-074197

(51) Int. Cl.
*H01M 10/04* (2006.01)
*H01M 50/147* (2021.01)
(Continued)

(52) U.S. Cl.
CPC ..... *H01M 10/0422* (2013.01); *H01M 50/147* (2021.01); *H01M 50/152* (2021.01);
(Continued)

(58) Field of Classification Search
CPC ............ H01M 50/183; H01M 50/186; H01M 50/188; H01M 50/147
See application file for complete search history.

(56) References Cited

U.S. PATENT DOCUMENTS 3,723,184 A * 3/1973 Stark et al. ......... H01M 50/166
429/174
2002/0182492 A1 12/2002 Kimura et al.
(Continued)

FOREIGN PATENT DOCUMENTS

CN 2574229 Y 9/2003
CN 102334212 A 1/2012
(Continued)

OTHER PUBLICATIONS

International Search Report and Written Opinion issued in corresponding International Application No. PCT/JP2019/014854, dated Jul. 9, 2019, with partial English translation.
(Continued)

*Primary Examiner* — Brian R Ohara
(74) *Attorney, Agent, or Firm* — Rimon, P.C.

(57) ABSTRACT

A battery including: a battery can having a cylindrical portion, a bottom wall closing one end of the cylindrical portion, and an open rim continuous with the other end of the cylindrical portion; an electrode body housed in the cylindrical portion; and a sealing body fixed to the open rim so as to seal an opening defined by the open rim. The sealing body includes a sealing plate and a gasket disposed at a peripheral portion of the sealing plate. The gasket has at least one protruding portion configured to restrict insertion of the sealing body into the open rim.

10 Claims, 5 Drawing Sheets

(51) Int. Cl.
  *H01M 50/152* (2021.01)
  *H01M 50/186* (2021.01)
  *H01M 50/193* (2021.01)
  *H01M 50/593* (2021.01)

(52) U.S. Cl.
  CPC ....... *H01M 50/186* (2021.01); *H01M 50/193* (2021.01); *H01M 50/593* (2021.01)

(56) References Cited

U.S. PATENT DOCUMENTS

| | | |
|---|---|---|
| 2010/0216014 A1 | 8/2010 | Wendling et al. |
| 2012/0164490 A1* | 6/2012 | Itoi .................... H01M 50/358 429/82 |
| 2013/0216870 A1* | 8/2013 | Kim .................... H01M 50/107 429/61 |
| 2013/0236757 A1* | 9/2013 | Tikhonov .......... H01M 10/0445 29/623.2 |
| 2015/0004446 A1* | 1/2015 | Kim .................... H01M 50/325 29/623.2 |
| 2018/0062122 A1* | 3/2018 | Lee .................... H01M 50/3425 |

FOREIGN PATENT DOCUMENTS

| | | |
|---|---|---|
| CN | 104285314 | 1/2014 |
| JP | S59-121771 A | 7/1984 |
| JP | H7-105933 A | 4/1995 |
| JP | H10-199495 A | 7/1998 |
| JP | 2863591 B2 | 3/1999 |
| JP | 2012-518890 A | 8/2012 |
| JP | 2015-534232 A | 11/2015 |

OTHER PUBLICATIONS

Chinese Office Action dated Apr. 11, 2022 issued in the corresponding Chinese Patent Application No. 201980021369.1, with partial English translation.

* cited by examiner

FIG. 2B(a)
FIG. 2B(b)
FIG. 2B(c)
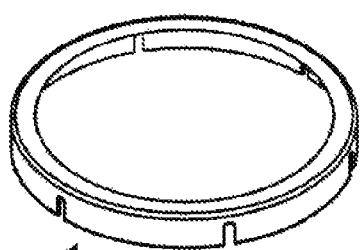
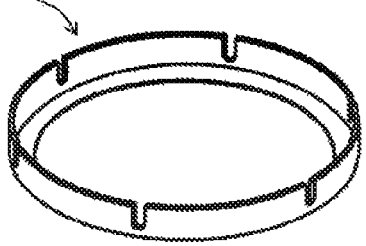
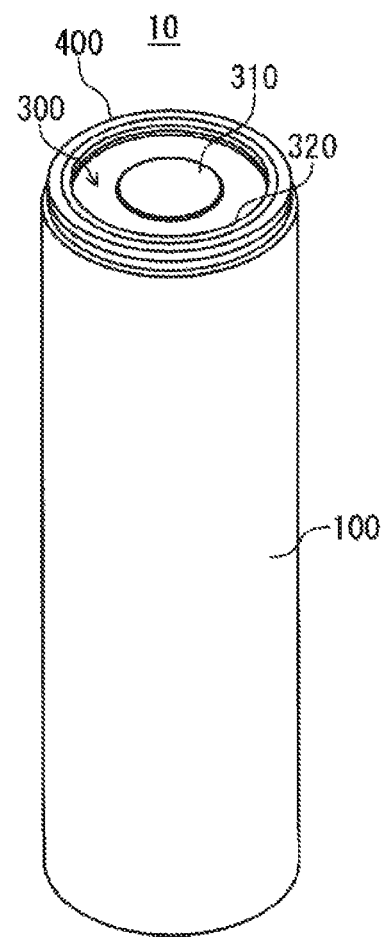

BATTERY

CROSS-REFERENCE OF RELATED APPLICATIONS

This application is the U.S. National Phase under 35 U.S.C. § 371 of International Patent Application No. PCT/JP2019/014854, filed on Apr. 3, 2019, which in turn claims the benefit of Japanese Application No. 2018-074197, filed on Apr. 6, 2018, the entire disclosures of which Applications are incorporated by reference herein.

TECHNICAL FIELD

The present invention relates to a battery including a battery can, an electrode body housed in the battery can, and a sealing body sealing the opening of the battery can.

BACKGROUND ART

When sealing the opening of the battery can with a sealing body, typically, the battery can is constricted inward in the vicinity of the opening, so that an annular groove is formed therearound. The sealing body has a gasket provided at its peripheral portion. The gasket of the sealing body is disposed between the annular groove and the end of the battery can, and compressed vertically, and thereby the sealing body is fixed to the battery can (see Patent Literature 1).

CITATION LIST

Patent Literature

[PTL 1] Japanese Laid-Open Patent Publication No. H7-105933

SUMMARY OF INVENTION

Technical Problem

When the sealing body is inserted into the battery can through the opening, the annular groove serves as a positioning for temporarily securing the sealing body in the vicinity of the opening. The annular groove, however, is not always necessary. High energy density batteries in which the annular groove is omitted have been under development. In this case, it becomes difficult to temporarily secure the sealing body in the vicinity of the opening, which may reduce the productivity of the battery.

The annular groove is formed close to the upper end surface of the electrode body housed in the battery can. Therefore, in order to prevent internal short circuit, an electrically insulating plate is necessary to be provided. The insulating plate is placed between the upper end surface of the electrode body and the annular groove. In this case, between the sealing body and the electrode body, there disposed are the annular groove whose thickness is more than twice as large as the wall thickness of the battery can, and the insulating plate. Accordingly, the shortest distance between the sealing body and the electrode body increases, and this imposes a limitation on the improvement in the energy density within the can.

Solution to Problem

One aspect of the present invention relates to a battery including: a battery can having a cylindrical portion, a bottom wall closing one end of the cylindrical portion, and an open rim continuous with the other end of the cylindrical portion; an electrode body housed in the cylindrical portion; and a sealing body fixed to the open rim so as to seal an opening defined by the open rim, the sealing body including a sealing plate and a gasket disposed at a peripheral portion of the sealing plate, the gasket having at least one protruding portion configured to restrict insertion of the sealing body into the open rim.

Advantageous Effects of Invention

According to the present invention, batteries with high energy density can be produced with ease.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2B An oblique view (a) of the cap and a rear view (b) thereof, and an oblique view (c) of the battery including the cap.

DESCRIPTION OF EMBODIMENTS

Figure 1A:
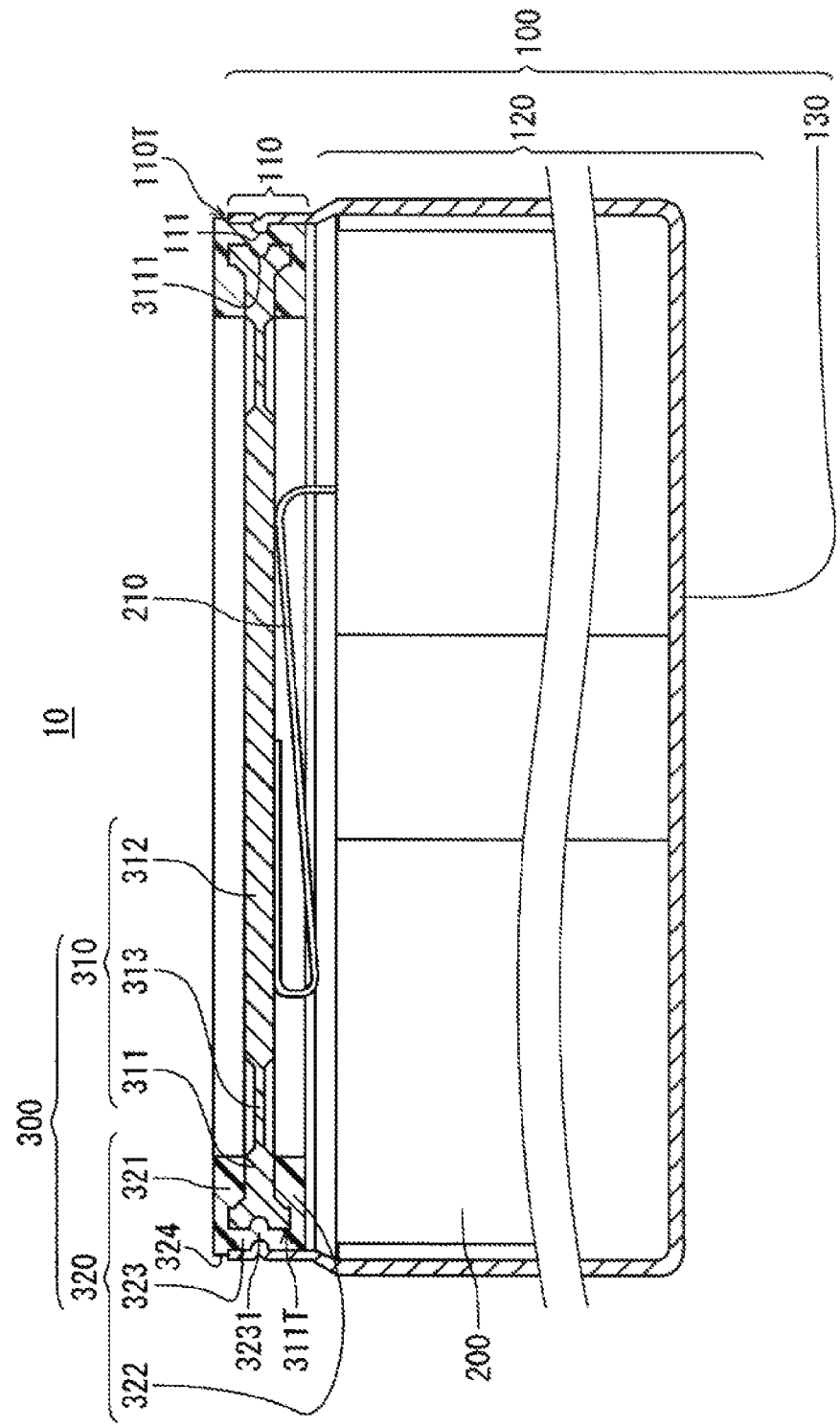
FIG. 1A A schematic vertical cross-sectional view of an essential part of a battery according to an embodiment of the present invention.

A battery according to the present embodiment includes: a battery can having a cylindrical portion, a bottom wall closing one end of the cylindrical portion, and an open rim continuous with the other end of the cylindrical portion; an electrode body housed in the cylindrical portion; and a sealing body fixed to the open rim so as to seal an opening defined by the open rim. The sealing body includes a sealing plate and a gasket disposed at a peripheral portion of the sealing plate. The gasket has at least one protruding portion configured to restrict insertion of the sealing body into the open rim.

The protruding portion comes in abutment, for example, with the open rim from outside in the axial direction of the battery can, when the sealing body is inserted into the open rim. The movement of the sealing body is suspended at the place where protruding portion comes in abutment with the open rim, and this restricts the sealing body to be inserted deeper inside the battery can. In this way, regardless of whether the annular groove is present or not, the sealing body can be temporally secured at a position where the sealing body is to be fixed (hereinafter, a fixed position).

The gasket may be of any shape, and has: for example, an inner ring portion disposed on the side facing the electrode body (the inner side) of the peripheral portion of the sealing plate; and a side wall portion covering an end surface of the peripheral portion of the sealing plate. The gasket preferably further has an outer ring portion disposed on the outer side of the peripheral portion of the sealing plate. More specifically, the gasket preferably has an outer ring portion and an inner ring portion sandwiching the peripheral portion of the sealing plate therebetween, and a side wall portion covering an end surface of the peripheral portion of the sealing plate so as to connect the outer ring portion with the inner ring portion.

The protruding portion is designed so as to come in abutment with the open rim at any portion thereof, when the sealing plate is inserted into the open rim until it reaches the fixed position. The protruding portion may have any size and shape, but is preferably not so large as to extend outward beyond the cylindrical portion of the battery can in its radial direction, and is designed, for example, so as not to extend outward beyond the open rim.

When the open rim faces outside of the battery can in its height direction (axial direction), the protruding portion is provided on the gasket so as to come in abutment with the endmost portion or its vicinity of the open rim. The vicinity of the endmost portion of the open rim refers to an area within 1 mm from the end surface of the endmost portion.

For example, the protruding portion is provided on the outer ring portion or the side wall portion of the gasket such that the outer diameter of the gasket becomes partially larger than the inner diameter of the open rim measured at its endmost portion. In this case, the protruding portion of the gasket comes in abutment with the end surface of the endmost portion of the open rim.

When the protruding portion is provided on the side wall portion of the gasket, it is preferable to provide the protruding portion nearer to the outer ring portion of the sealing body than to the center of the side wall portion, in the height direction of the battery can. This allows the sealing body to face the open rim in a sufficiently large area.

The protruding portion may be provided in a plurality of numbers along the open rim. When the protruding portion is provided in a plurality of numbers, the protruding portions (at least two, preferably three or more protruding portions) are provided preferably at equi-angular intervals with respect to the center of the opening.

The protruding portion may be formed in a flange shape along the open rim. The flange-shaped protruding portion may be continuously provided along the entire circumference of the gasket, or may be partially provided.

In a preferred embodiment, the gasket or its side wall portion is compressed between the end surface of the peripheral portion of the sealing plate and the open rim, in the radial direction of the opening. Specifically, the open rim has a pressing portion for pressing the gasket against the end surface of the peripheral portion of the sealing plate. The gasket is compressed by the pressing portion in the radial direction of the opening, and the repulsive force of the gasket acts to ensure the airtightness between the sealing body and the open rim.

In other words, the open rim of the battery can presses the gasket not in the axial direction (hereinafter, sometimes referred to as Z direction) of the battery can but in the direction perpendicular to the Z direction (hereinafter, sometimes referred to as XY direction). In this case, given that the pressing force of the open rim exerted on the gasket is decomposed in two directions: Z and XY, the scalar quantity of the vector in the XY direction is larger than that in the Z direction.

The open rim of the battery can may have a projection as at least part of the pressing portion, the projection protruding inward in the radial direction. In this case, the gasket or its side wall portion is compressed in the radial direction at least by the projection. Such a projection can be formed by constricting the open rim inward. The projection may be formed intermittently in a plurality of numbers along the circumferential direction of the opening, or may be formed continuously along the circumferential direction of the opening. The continuously formed projection can form an annular groove along the circumferential direction of the opening. The projection(s) can press the gasket or its side wall portion more strongly toward the end surface of the peripheral portion of the sealing plate. In this way, the airtightness between the sealing body and the open rim can be more reliably ensured.

When the projection is formed intermittently in a plurality of numbers, the projections (at least two, preferably three or more projections) are provided preferably at equi-angular intervals with respect to the center of the opening.

In the height direction of the battery can, the projection is preferably substantially equal in position to the center of the end surface of the peripheral portion of the sealing plate. By aligning the position of the projection and the center position of the end surface flush with each other, when forming the projection on the open rim of the battery, the deformation of the sealing plate can be suppressed. Moreover, the pressure applied to the gasket or its side wall portion is unlikely to be uneven. Accordingly, the deformation of the gasket tends to be suppressed, and the gasket can be compressed to a higher degree. This increases the airtightness inside the can.

Here, that the projection is substantially equal in position to the center of the end surface of the peripheral portion of the sealing plate means that, in the height direction of the battery can, the difference between the position of the projection and the center position of the end surface of the sealing plate is 2% or less of a height H of the battery can.

At the center position of the end surface of the peripheral portion of the sealing plate, a recessed groove may be formed so as to correspond to the projection provided on the open rim of the battery can. By providing the recessed groove, when forming the projection on the open rim of the battery, the deformation of the sealing plate can be more effectively suppressed, and the pressure applied to the gasket or its side wall portion is less likely to be uneven. The difference between the center position of the recessed groove and the position of the projection in the height direction of the battery can is 2% or less of the height H of the battery can.

In the height direction of the battery can, the open rim is made smaller in outer diameter at its lowermost position (the innermost position) in contact with the gasket or its inner ring portion, than the cylindrical portion. In this case, it is preferable to provide an annular cap which covers the gasket or its outer ring portion from the Z direction and covers the outer peripheral surface of the open rim of the battery can from the XY direction. The cap serves to protect the peripheral portion of the sealing plate and the open rim of the battery can. At this time, by joining the cap to the open rim, the sealing body can be more securely fixed to the battery can. The cap may be designed in such a thickness that the outer diameter of the cap becomes almost equal to the outer diameter of the cylindrical portion.

It is desirable that the sealing plate and the gasket are integrally molded by an insert molding technique or the like. According to the integral molding, the sealing plate and the gasket are easily welded to each other. By integrally molding the sealing plate and the gasket, the sealing body can be handled as one component, which can simplify the production of the battery.

According to the above configuration, it is not necessary to press the gasket in the Z direction for hermetically sealing the battery can. This eliminates the necessity of providing the battery can with a constricted portion interposed between the gasket or its inner ring portion and the electrode body. Therefore, the shortest distance between the sealing body and the electrode body can be decreased, and the energy density inside the can tends to be increased. Specifically, the shortest distance between the sealing body and the electrode body can be set to, for example, 2 mm or less, and preferably 1.5 mm or less.

A description will be given below of a battery according to an embodiment of the present invention with reference to the drawings. It is to be noted, however, the present invention is not limited thereto.

Figure 1B:
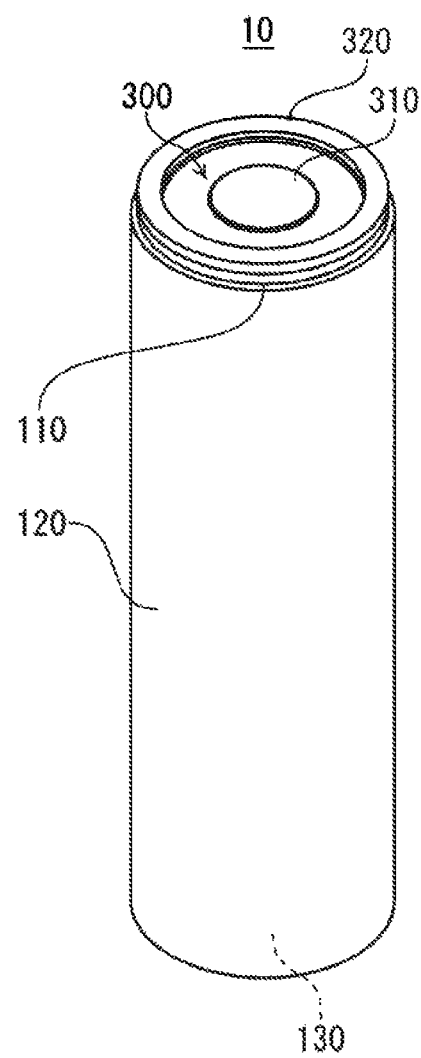
FIG. 1B An oblique view of the battery.

FIG. 1A is a schematic vertical cross-sectional view of an essential part of a battery 10 according to the present embodiment. FIG. 1B is an oblique view of the battery. The battery 10 has a cylindrical shape, and includes a cylindrical bottomed battery can 100, a cylindrical electrode body 200 housed in the can, and a sealing body 300 sealing the opening of the battery can 100.

The battery can 100 includes: a cylindrical portion 120 housing the electrode body 200; a bottom wall 130 closing one end of the cylindrical portion 120; and an open rim 110 continuous with the other end of the cylindrical portion 120. The opening defined by the open rim 110 is closed by the sealing body 300.

The sealing body 300 has a sealing plate 310 and a gasket 320 disposed at a peripheral portion 311 of the sealing plate 310. The sealing plate 310 is disk-shaped and has an explosion-proof function. Specifically, the sealing plate 310 includes the peripheral portion 311 and a center region 312, both having a thick wall thickness and serving to provide structural strength, and a thin-walled portion 313 configured to exhibit an explosion-proof function. The thin-walled portion 313 is provided between the peripheral portion 311 and the center region 312. To the inner surface of the center region 312, one end of a lead wire 210 extended from a positive electrode or a negative electrode constituting the electrode body 200 is connected. Thus, the sealing plate 310 functions as a terminal of one of the electrodes. The lead wire 210 is electrically shielded from the electrode body with, for example, an insulating tape (not shown), in order to prevent internal short circuit.

When the internal pressure of the battery can 100 rises, the sealing plate 310 bulges outward, and the stress due to tension is concentrated, for example, on the boundary between the peripheral portion 311 and the thin-walled portion 313, causing a break to occur from the boundary. As a result, the internal pressure of the battery can 100 is released, and the safety of the battery 10 can be ensured. Alternatively, the sealing body 300 comes off from the open rim 110 and the internal pressure is released.

The sealing plate 310 may be of any shape. In the illustrated example, the peripheral portion 311 is made thicker than the center region 312. The thick peripheral portion 311 can receive over a large area the pressure applied thereto from the open rim 110 of the battery can 100 in the radial direction of the opening, allowing the stress to be easily dispersed. A recessed groove 3111 is formed at the center position of an end surface 311T of the peripheral portion 311 so as to correspond to a projection 111 of the open rim 110.

The gasket 320 has an outer ring portion 321 and an inner ring portion 322, and a side wall portion 323 connecting the outer ring portion 321 with the inner ring portion 322. The end surface 311T of the peripheral portion 311 of the sealing plate 310 is covered with the side wall portion 323. The outer ring portion 321 and the inner ring portion 322 sandwich the peripheral portion 311 of the sealing plate 310 therebetween, and thereby the gasket 320 is secured to the sealing plate 310. The inner ring portion 322 also serves to prevent an internal short circuit due to a contact between the electrode body 200 and the sealing plate 310. Making the inner ring portion 322 larger in area can enhance its function to prevent the internal short circuit.

The side wall portion 323 of the gasket 320 is provided at its uppermost end in the height direction of the battery can 100 with a flange-shaped protruding portion 324. The outer diameter of the protruding portion 324 is slightly larger than the inner diameter of the endmost portion of the open rim. That is, the protruding portion 324 protrudes outward in the radial direction slightly beyond the rest of the side wall portion 323 so as to come in abutment with an end surface 110T of the endmost portion of the open rim 110. When the sealing body 300 inserted from the inner ring portion 322 side into the inside of the open rim 110 is moved to a predetermined fixed position of the sealing body 300, the protruding portion 324 comes in abutment with the end surface 110T of the open rim 110, and the sealing body 300 is temporarily secured at the fixed position.

The outer ring portion 321, the inner ring portion 322, and the side wall portion 323 are formed as an integrally molded product. The gasket 320 can be integrally molded with the sealing plate 310, for example, by an insert molding technique.

To ensure the airtightness between the open rim 110 of the battery can 100 and the sealing body 300, it is necessary that at least part of the open rim 110 presses the side wall portion 323 of the gasket 320 against the end surface 311T of the peripheral portion 311 of the sealing plate 310, compressing the side wall portion 323 in the radial direction of the opening. Here, the projection 111 protruding inward is formed on the open rim 110 along the circumference of the opening, pressing the side wall portion 323 against the end surface 311T. The side wall portion 323 of the gasket 320 may be provided with a recessed portion 3231 in advance at a position corresponding to the projection 111. Providing the recessed portion 3231 on the gasket 320 can prevent the gasket 320 from being excessively deformed when the side wall 323 is compressed.

In the height direction of the battery can 100, the projection 111 is substantially equal in position to the center of the end surface 311T of the peripheral portion 311 of the sealing plate 310. By aligning the positions as above, the deformation of the sealing plate 310 and the gasket 320 can be suppressed, and the side wall portion 323 tends to be compressed to a higher degree. This can more reliably ensure the airtightness between the sealing body 300 and the open rim 110.

In the open rim 110 of the battery can 100, the endmost portion having the end surface 110T extends in the direction forming an angle of less than 5° with the axial direction (Z direction) of the battery can 100. This prevents the gasket 320 from being subjected to excessive stress, making it possible for the gasket 320 to ensure the airtightness more easily and reliably.

The open rim 110 of the battery can 100 is made smaller in outer diameter than the cylindrical portion 120, at the lowest position of the open rim in contact with the inner ring portion 322 of the gasket 320, in the height direction of the battery can 100 of the battery 10. The outer ring portion 321 protrudes beyond the end surface 110T of the open rim 110 in the axial direction (Z direction) of the battery can 100. In such a case, it is preferable to provide a protective member so as to cover the open rim 110 of the battery can 100 and the outer ring portion 321 of the gasket 320.

Figure 2A:
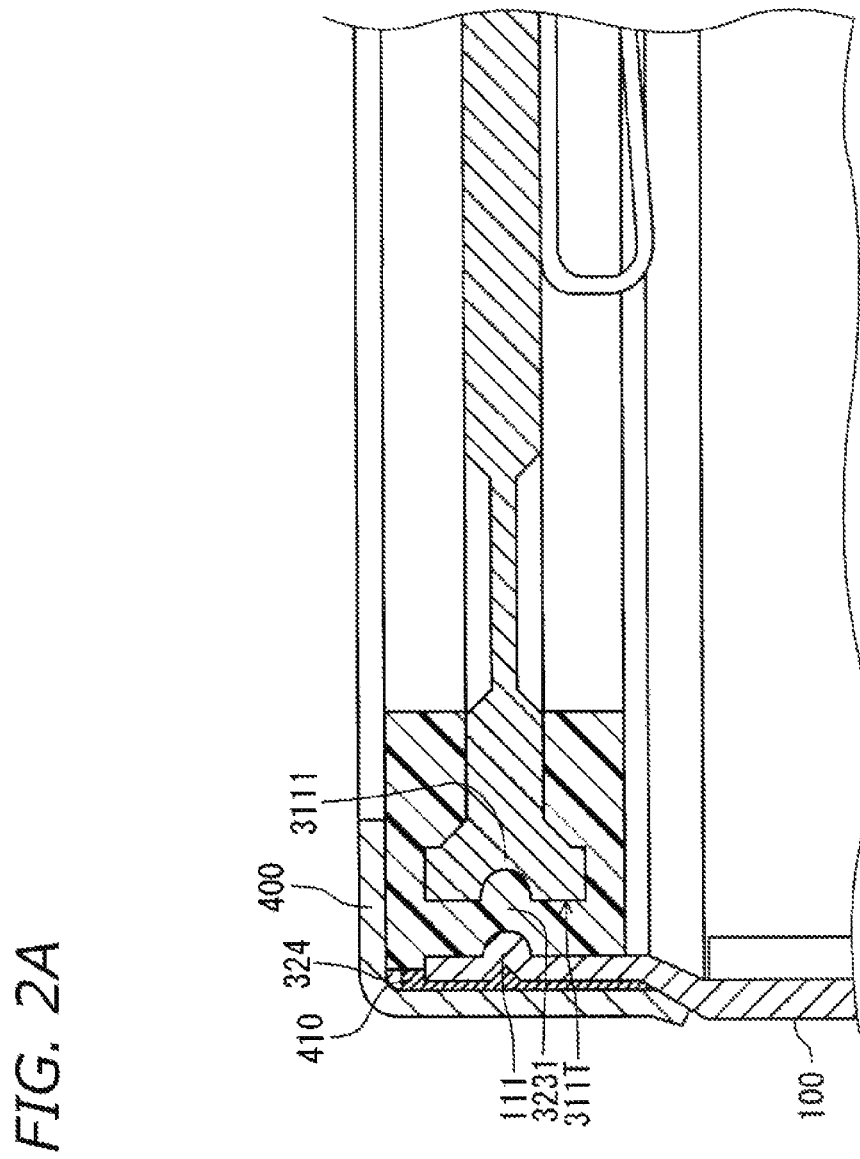
FIG. 2A schematic vertical cross-sectional view of an essential part of the battery including a cap.

FIG. 2A is a schematic vertical cross-sectional view of an essential part of the battery 10 including a cap 400 serving as the protective member. FIG. 2B is an oblique view (a) of the cap 400 and a rear view (b) thereof, and an oblique view (c) of the battery including the cap 400.

The annular cap 400 covers the outer ring portion 321 of the gasket 320 from the Z direction, and covers the outer peripheral surface of the open rim 110 of the battery can 100 from the XY direction. The cap 400 may have any thickness, and may be designed, for example, in such a thickness that the outer diameter of the cap 400 becomes substantially equal to the outer diameter of the cylindrical portion 120. A joining material 410 may be interposed between the cap 400 and the outer peripheral surface of the open rim 110. The difference between the outer diameter or the maximum outer diameter of the cap 400 and the outer diameter or the maximum outer diameter of the cylindrical portion 120 is, for example, 20% or less of an outer diameter D of the cylindrical portion 120. The difference may be 10% or less, and may be 5% or less or 2% or less.

When the cap 400 has electrical conductivity, the cap 400 can be configured to function as a terminal having a polarity different from that of the sealing plate 310. When the cap 400 is made function as a terminal, the other electrode having a polarity different from that of the sealing plate 310 is connected to the battery can 100. The cap 400 is joined to the open rim 110 by welding or the like. The cap 400 is an accessory, the shape of which can be flexibly designed according to use.

In the battery 10 illustrated in FIGS. 1 and 2, the battery can 100 does not have a constricted portion interposed between the gasket 320 or the inner ring portion 322 and the electrode body 200. Therefore, the shortest distance between the sealing body 300 and the electrode body 200 can be reduced to, for example, 1 mm or less.

Next, a description will be given of an example of a production method of the battery 10, with reference to FIG. 3.

(1) Preparation Step

Figures 3A, 3B, 3C:
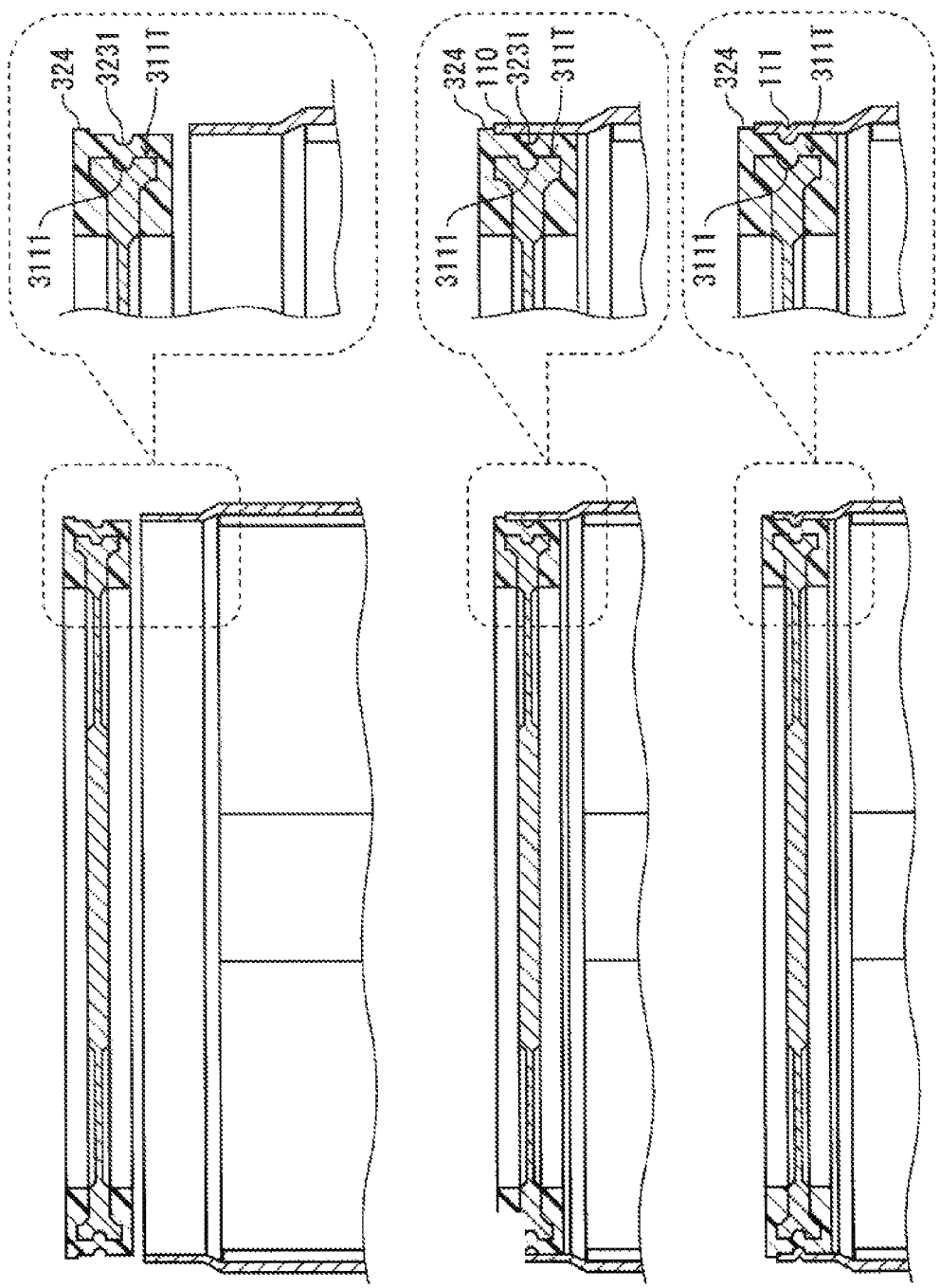
FIG. 3 Explanatory diagrams of an example of a production method of the battery including a preparation step (A), a sealing step (B), and a lateral crimping step (C).

As illustrated in FIG. 3(A), a battery can 100 including an electrode body 200 housed in a cylindrical portion 120, and a sealing body 300 are prepared first. Before inserting the electrode body 200 into the can, the battery can 100 has an open rim 110 formed sufficiently larger in diameter than the electrode body 200. After the electrode body 200 is housed in the can, the open rim 110 is constricted radially, so that the outer diameter of the open rim 110 becomes smaller than that of the cylindrical portion 120.

The sealing body 300 can be prepared by insert-molding a gasket 320 together with a sealing plate 310. The thickness of the sealing plate 310 at a peripheral portion 311 is larger than that at a center region 312, and the peripheral portion 311 is provided with a recessed groove 3111 at the center position of an end surface 311T. Likewise, the gasket 320 is provided with a recessed portion 3231 at a position corresponding to the recessed groove 3111. The gasket is also provided with a flange-shaped protruding portion 324 on a side wall portion 323 at its uppermost end.

The gasket 320 may be made of any material. Examples of the material include polypropylene (PP), polyphenylene sulfide (PPS), polyethylene (PE), polybutylene terephthalate (PBT), perfluoroalkoxyalkane (PFA), polytetrafluoroethylene (PTFE), and polyamide (PA).

(2) Sealing Step

Next, as illustrated in FIG. 3(B), the sealing body 300 is inserted into the inside of the open rim 110 of the battery can 100. The sealing body 300 can be temporarily secured (positioned), as illustrated in FIG. 3, by bringing the protruding portion 324 provided on the side wall portion 323 of the gasket 320 into abutment with an end surface 110T of the open rim 110.

(3) Lateral Crimping Step

Next, as illustrated in FIG. 3(C), a grooving processing is applied to the open rim 110 of the battery can 100 so as to be recessed inward at a position corresponding to the recessed groove 3111 and the recessed portion 3231. A projection 111 protruding inward is thus formed on the open rim 110, so that the projection 111 presses the side wall portion 323 of the gasket 320 against the end surface 311T of the peripheral portion 311 of the sealing plate 310. As a result, the side wall portion 323 of the gasket 320 is compressed in the radial direction of the opening, and due to the repulsive force of the gasket 320, the airtightness between the sealing body 300 and the open rim 110 is ensured.

Next, an illustrative description will be given of a configuration of the electrode body 200, with a lithium ion secondary battery taken as an example.

The cylindrical electrode body 200 is of a wound type, and is formed by spirally winding a positive electrode and a negative electrode with a separator interposed therebetween. To one of the positive and negative electrodes, a lead wire 210 is connected. The lead wire 210 is connected to the inner surface of the center region 312 of the sealing plate 310 by welding or the like. To the other one of the positive and negative electrodes, another lead wire is connected. The another lead wire is connected to the inner surface of the battery can 100 by welding or the like.

(Negative Electrode)

The negative electrode has a belt-like negative electrode current collector and a negative electrode active material layer formed on both sides of the negative electrode current collector. The negative electrode current collector is, for example, a metal film, a metal foil, or the like. The material of the negative electrode current collector is preferably at least one selected from the group consisting of copper, nickel, titanium, alloys thereof, and stainless steel. The negative electrode current collector preferably has a thickness of, for example, 5 to 30 μm.

The negative electrode active material layer contains a negative electrode active material, and optionally contains a binder and an electrically conductive material. The negative electrode active material layer may be a deposition film formed by a gas phase method (e.g., vapor deposition). Examples of the negative electrode active material include Li metal, a metal or an alloy that electrochemically reacts with Li, a carbon material (e g graphite), a silicon alloy, a silicon oxide, and a metal oxide (e.g., lithium titanate). The negative electrode active material layer preferably has a thickness of, for example, 1 to 300 μm.

(Positive Electrode)

The positive electrode has a belt-like positive electrode current collector and a positive electrode active material layer formed on both sides of the positive electrode current collector. The positive electrode current collector is, for example, a metal film, a metal foil (stainless steel foil, aluminum foil, or aluminum alloy foil), or the like.

The positive electrode active material layer contains a positive electrode active material and a binder, and optionally contains an electrically conductive material. The positive electrode active material is not limited, but may be a lithium-containing composite oxide, such as $LiCoO_2$ or $LiNiO_2$. The positive electrode active material layer preferably has a thickness of, for example, 1 to 300 μm.

Examples of the conductive material contained in each active material layer include graphite and carbon black. The conductive material is contained in an amount of, for example, 0 to 20 parts by mass per 100 parts by mass of the active material. Examples of the binder contained in the active material layer include fluorocarbon resin, acrylic resin, and rubber particles. The binder is contained in an amount of, for example, 0.5 to 15 parts by mass per 100 parts by mass of the active material.

(Separator)

The separator is preferably a microporous resin film or a nonwoven resin fabric. Examples of the material (resin) of the separator include polyolefin, polyamide, and polyamide imide. The separator has a thickness of, for example, 8 to 30 μm.

(Electrolyte)

The electrolyte may be a non-aqueous solvent in which a lithium salt is dissolved. Examples of the lithium salt include $LiClO_4$, $LiBF_4$, $LiPF_6$, $LiCF_3SO_3$, $LiCF_3CO_2$, and imide salts. Examples of the non-aqueous solvent include: cyclic carbonic esters, such as propylene carbonate, ethylene carbonate, and butylene carbonate; chain carbonic esters, such as diethyl carbonate, ethyl methyl carbonate, and dimethyl carbonate; and cyclic carboxylic acid esters, such as γ-butyrolactone and γ-valerolactone.

INDUSTRIAL APPLICABILITY

The battery according to the present invention is useful for non-aqueous electrolyte secondary batteries (esp., lithium ion secondary batteries) required to have a high energy density, and is suitably applicable as a power source for, for example, portable devices, hybrid vehicles, electric vehicles, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: battery, 100: battery can, 110: open rim, 110T: end surface, 111: projection, 120: cylindrical portion, 130: bottom wall, 200: electrode body, 210: lead wire, 300: sealing body, 310: sealing plate, 311: peripheral portion, 311T: end surface, 3111: recessed groove, 312: center region, 313: thin-walled portion, 320: gasket, 321: outer ring portion, 322: inner ring portion, 323: side wall portion, 3231: recessed portion, 324: protruding portion, 400: cap, 410: joining material

The invention claimed is:

1. A battery comprising:
a battery can having a cylindrical portion, a bottom wall closing one end of the cylindrical portion, and an open rim continuous with the other end of the cylindrical portion; an electrode body housed in the cylindrical portion; and a sealing body fixed to the open rim so as to seal an opening defined by the open rim, and
an endmost portion of the open rim, which includes an end surface of the open rim, extends in a direction forming an angle of less than 5° with an axial direction of the battery can, the end surface being the uppermost surface of the open rim in the axial direction of the battery,
the sealing body including a sealing plate and a gasket disposed at a peripheral portion of the sealing plate,
the gasket having at least one protruding portion configured to restrict the sealing body from being inserted entirely into the open rim, the protruding portion protruding outward in a radial direction and being disposed on the end surface of the open rim.

2. The battery of claim 1, wherein the insertion of the sealing body into the open rim is restricted when the protruding portion comes in abutment with the open rim from outside in an axial direction of the battery can.

3. The battery of claim 1, wherein the protruding portion is provided in a plurality of numbers along the open rim.

4. The battery of claim 1, wherein the protruding portion is formed in a flange shape along the open rim.

5. The battery of claim 1, wherein the gasket is compressed between an end surface of the peripheral portion and the open rim, in a radial direction of the opening.

6. The battery of claim 5, wherein
the open rim has a projection protruding inward in the radial direction, and
the gasket is compressed in the radial direction by the projection.

7. The battery of claim 1, wherein the sealing plate and the gasket are integrally molded, to be welded to each other.

8. The battery of claim 1, wherein the battery can is configured not to have a constricted portion interposed between the gasket and the electrode body.

9. The battery of claim 1, wherein a shortest distance between the sealing body and the electrode body is 2 mm or less.

10. The battery of claim 1, wherein the uppermost surface of the gasket is higher than the end surface of the open rim in the axial direction of the battery.

* * * * *